United States Patent
Fan et al.

(10) Patent No.: US 7,492,584 B2
(45) Date of Patent: Feb. 17, 2009

(54) COMPUTER ENCLOSURE WITH DISK DRIVE BRACKET

(75) Inventors: Chen-Lu Fan, Tu-Cheng, Taipei Hsien (TW); Li-Ping Chen, Tu-Cheng, Taipei Hsien (TW)

(73) Assignee: Hon Hai Precision Industry Co., Ltd., Tu-Chung, Taipei Hsien (TW)

( * ) Notice: Subject to any disclaimer, the term of this patent is extended or adjusted under 35 U.S.C. 154(b) by 176 days.

(21) Appl. No.: 11/560,856

(22) Filed: Nov. 17, 2006

(65) Prior Publication Data
US 2008/0117587 A1  May 22, 2008

(51) Int. Cl.
*G06F 1/16* (2006.01)
*H05K 5/00* (2006.01)
*H05K 7/00* (2006.01)

(52) U.S. Cl. .................................. 361/685; 312/223.2
(58) Field of Classification Search ................. 361/685; 312/223.2, 223.3
See application file for complete search history.

(56) References Cited

U.S. PATENT DOCUMENTS

| | | | |
|---|---|---|---|
| 6,201,702 B1 * | 3/2001 | Schmitt | 361/725 |
| 6,351,374 B1 * | 2/2002 | Sherry | 361/685 |
| 6,644,762 B1 | 11/2003 | Chen | |
| 6,856,508 B2 * | 2/2005 | Rabinovitz | 361/685 |
| 7,126,817 B2 * | 10/2006 | Li | 361/685 |
| 7,190,574 B2 * | 3/2007 | Muenzer et al. | 361/685 |
| 7,355,846 B1 * | 4/2008 | Chen et al. | 361/685 |
| 2004/0001308 A1 * | 1/2004 | Yang | 361/685 |
| 2004/0173544 A1 * | 9/2004 | Chen | 211/26 |
| 2006/0198095 A1 * | 9/2006 | Lee | 361/685 |
| 2007/0008693 A1 * | 1/2007 | Yeh et al. | 361/685 |

* cited by examiner

*Primary Examiner*—Hae Moon Hyeon
(74) *Attorney, Agent, or Firm*—Wei Te Chung

(57) ABSTRACT

A computer enclosure includes a disk drive bracket (10) and a chassis (20). The disk drive bracket includes a bottom wall (12), at least a fixing hole (121) is defined in the bottom wall of the disk drive bracket, a plurality of parallel slideways (123) extend from the bottom wall of the disk drive bracket; the chassis includes a bottom panel (22) supporting the bottom wall of the disk drive bracket, at least a standoff (221) engaging into the fixing hole of the disk drive bracket extends upwardly from the bottom panel, a plurality of parallel guideways (223) are formed on the bottom panel of the chassis for engaging with the slideways of the disk drive bracket.

17 Claims, 3 Drawing Sheets

COMPUTER ENCLOSURE WITH DISK DRIVE BRACKET

FIELD OF THE INVENTION

The present invention relates to computer enclosures, and more particularly to a computer enclosure with a disk drive bracket.

GENERAL BACKGROUND

When a conventional computer is assembled, at least a disk drive bracket is mounted in a computer enclosure. Data storage devices such as a hard disk drive, a floppy disk drive, and a compact disk read only memory drive are then attached to the drive bracket.

A disk drive bracket is usually secured to a computer enclosure between one side panel and a front panel of the computer enclosure. U.S. Pat. No. 6,644,762 discloses a computer enclosure including a front panel, a first drive bracket and a second drive bracket. A first opening and a second opening are defined in the front panel, corresponding to the first and second drive brackets. A plurality of clips extends inwardly from the front panel adjacent the first and second openings. A projection is formed on a middle portion of each clip. The first and second drive brackets each comprise a top panel, a bottom panel, and a side panel. An edge portion of each of these panels nearest the front panel is bent vertically to respectively form a plurality of bent panels. Each bent panel defines a pair of slots; except the bent panel of the bottom panel of the first drive bracket, which defines a pair of gateways. A plurality of recessed portions is formed in the panels of the first and second drives brackets, respectively corresponding to the slots of the bent panels. Each recessed portion defines a cutout therein. The clips of the front panel are received in the slots of the first and second drive brackets, and engaged with the corresponding recessed portions of the first and second drive brackets. The first and second drive brackets are thereby securely attached to the front panel.

However, the typical computer enclosure has a complicated structure, furthermore, when a plurality of storage devices is assembled into the drive brackets and vibration occurs, the bottom panels of the drive brackets are prone to be distorted.

What is needed, therefore, is a computer enclosure having a simple structure and a disk drive bracket which is not prone to be distorted.

SUMMARY

A computer enclosure includes a disk drive bracket and a chassis. The disk drive bracket includes a bottom wall and a pair of sidewalls connecting with two opposite sides of the bottom wall, at least a fixing hole is defined in the bottom wall of the disk drive bracket, a plurality of parallel sideways extends upwards from the bottom wall of the disk drive bracket. The chassis includes a bottom panel supporting the bottom wall of the disk drive bracket and a pair of side panels resisting against the sidewalls of the disk drive bracket respectively, at least a standoff engaging into the fixing hole of the disk drive bracket extends upwardly from the bottom panel, a plurality of parallel guideways are formed on the bottom panel of the chassis for engaging with the slideways of the disk drive bracket.

Other advantages and novel features will be drawn from the following detailed description of preferred embodiments with attached drawings, in which:

DETAILED DESCRIPTION OF PREFERRED EMBODIMENTS

Figure 1:
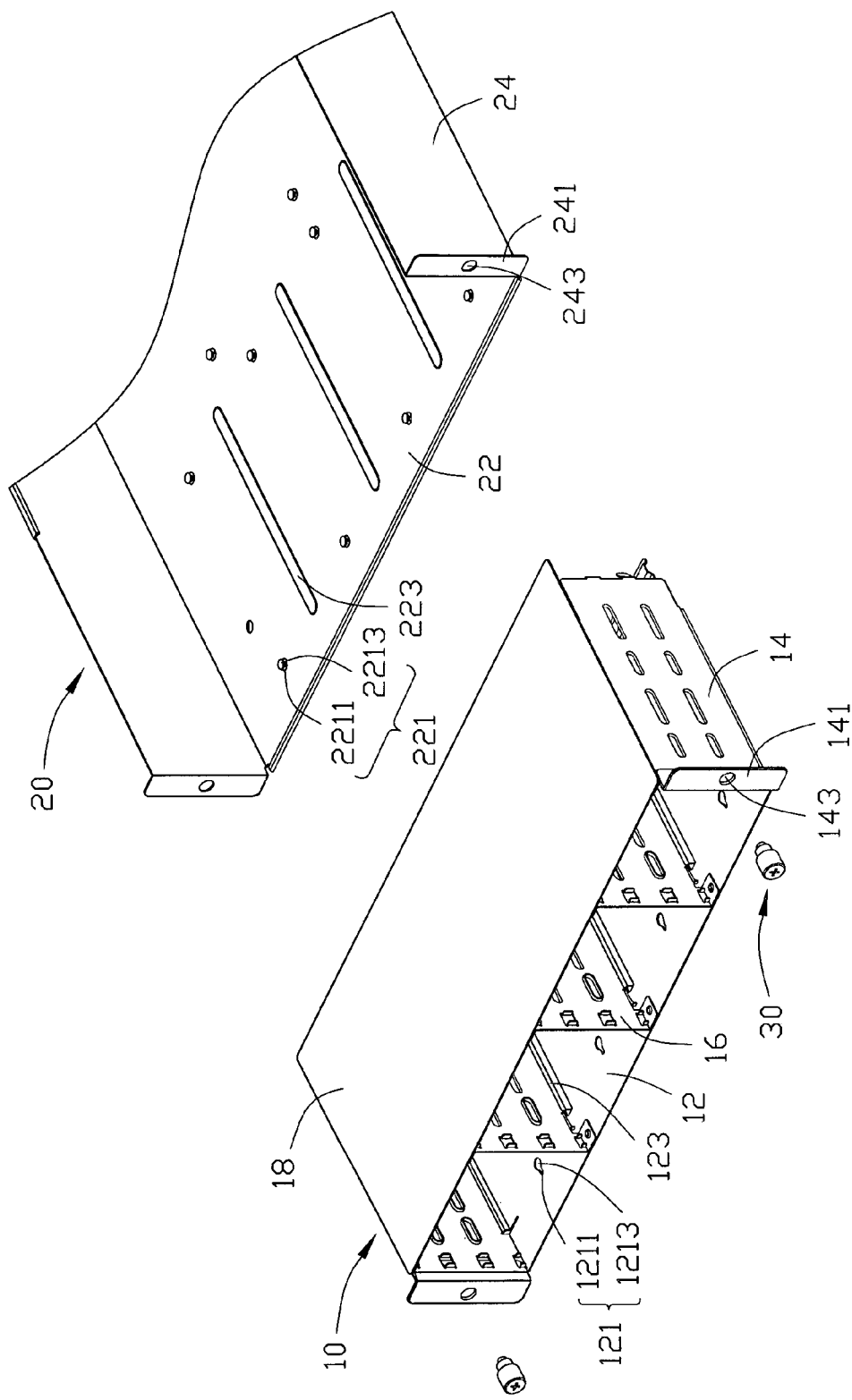
FIG. 1 is an exploded, isometric view of a computer enclosure in accordance with a preferred embodiment of the present invention, the computer enclosure including a chassis, a disk drive bracket, and a pair of screws.

Referring to FIG. 1, a computer enclosure in accordance with a preferred embodiment of the present invention includes a disk drive bracket 10 configured for accommodating a plurality of data storage devices (not shown) therein, a chassis 20 configured for receiving the disk drive bracket 10 and a plurality of other electronic components (not shown) therein, and a pair of screws 30.

Figure 2:
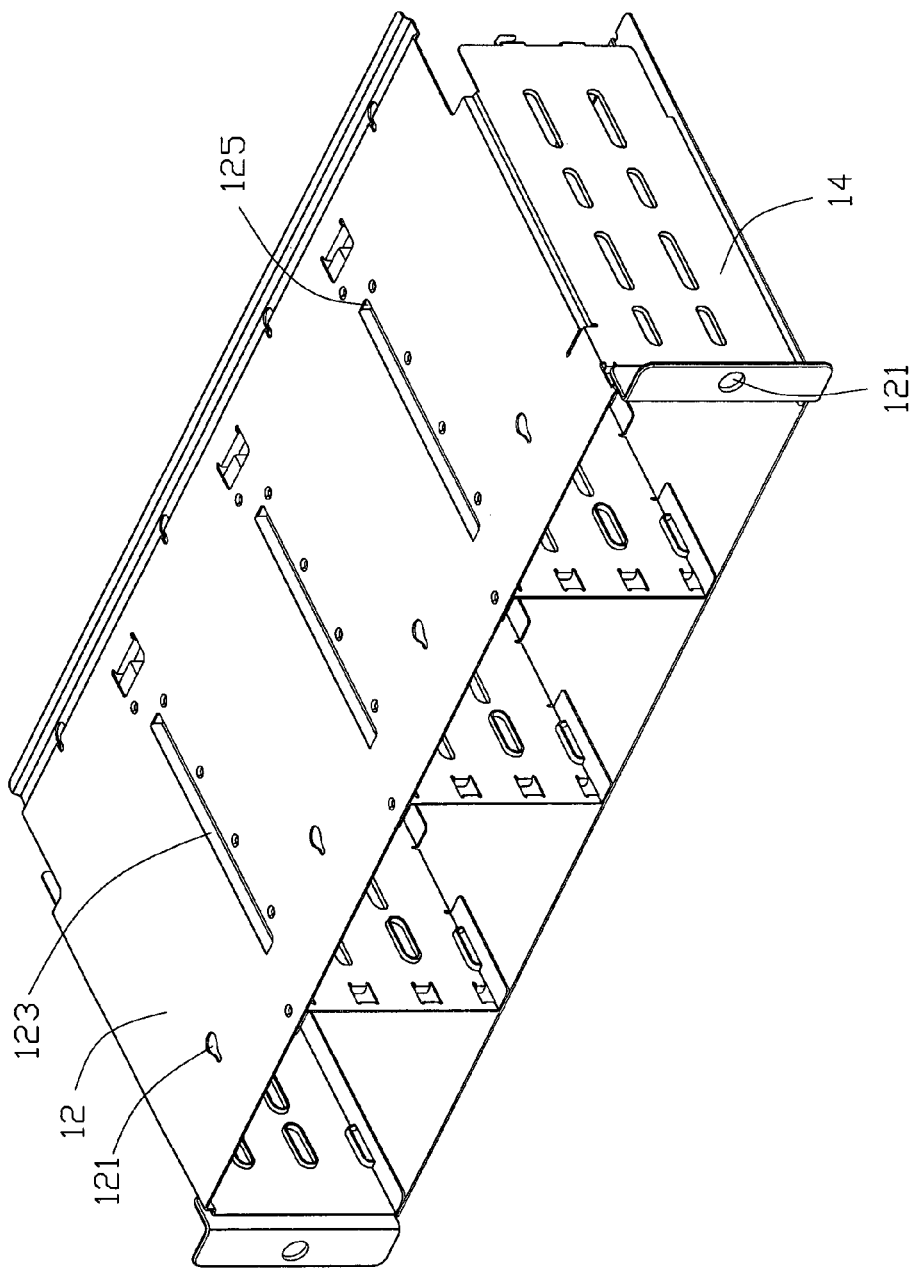
FIG. 2 is an enlarged view of the disk drive bracket of FIG. 1, viewed from another aspect.

Referring to FIG. 1 and FIG. 2, the disk drive bracket 10 includes a bottom wall 12, a pair of sidewalls 14 connecting with two opposite sides of the bottom wall 12 respectively, a plurality of parallel dividing walls 16, and a top wall 18 covered on the sidewalls 14 and the dividing walls 16. The bottom wall 12, the sidewalls 14, and the top wall 18 cooperatively configure a casing space. The dividing walls 16 divide the casing space into four portions for installing a plurality of disk drives. A plurality of generally teardrop shaped fixing holes 121 is defined in the bottom wall 12 of the disk drive bracket 10. Wider portions of the fixing holes 121 are called entrance apertures 1213, and narrow portions of the fixing holes 121 are called fixing apertures 1211. A plurality of long narrow, parallel openings 125 is defined in the bottom wall 12 of the disk drive bracket 10, a generally arc-shaped slideway 123 extends up from a long edge of each opening 125. A flange 141 extends out perpendicularly from each sidewall 14 of the disk drive bracket 10. A securing hole 143 is defined in each of the flange 141.

Referring to FIG. 1, the chassis 20 includes a bottom panel 22 and a pair of opposite side panels 24 connecting with the bottom panel 22. A plurality of standoffs 221 corresponding to the fixing holes 121 respectively, extend up from the bottom panel 22 of the chassis 20. Each of the standoffs 221 includes a neck portion 2211 and a head portion 2213. A plurality of long, narrow parallel guideways 223 corresponding to the slideways 123 of the disk drive bracket 10 are protruded from the bottom panel 22 of the chassis 20. The guideways 223 are generally arc shaped in cross section with a same arc length and curvature as cross sections of the slideways 123 of the disk drive bracket 10. In profile, a height of the guideways 223 is less than that of the standoffs 221. A flange 241 corresponding to the flange 141 of the disk drive bracket 10 extends out perpendicularly from each of the side panels 24 of the chassis 20 respectively. A securing hole 243 is defined in each flange 241, corresponding to the securing holes 143 of the disk drive bracket 10. Wherein a diameter of each of the entrance aperture 1213 of the fixing holes 121 of the disk drive bracket 10 is bigger than that of the heads 2213 in cross section. A diameter of each of the fixing apertures 1211 of the fixing holes 121 of the disk drive bracket 10 is less than that of the heads 2213 in cross section, and is approximately the same as that of the of the necks 2211 in cross section. A length of the bottom wall 12 of the disk drive bracket 10 is equal to the width of the bottom panel 22 of the chassis 20.

Figure 3:
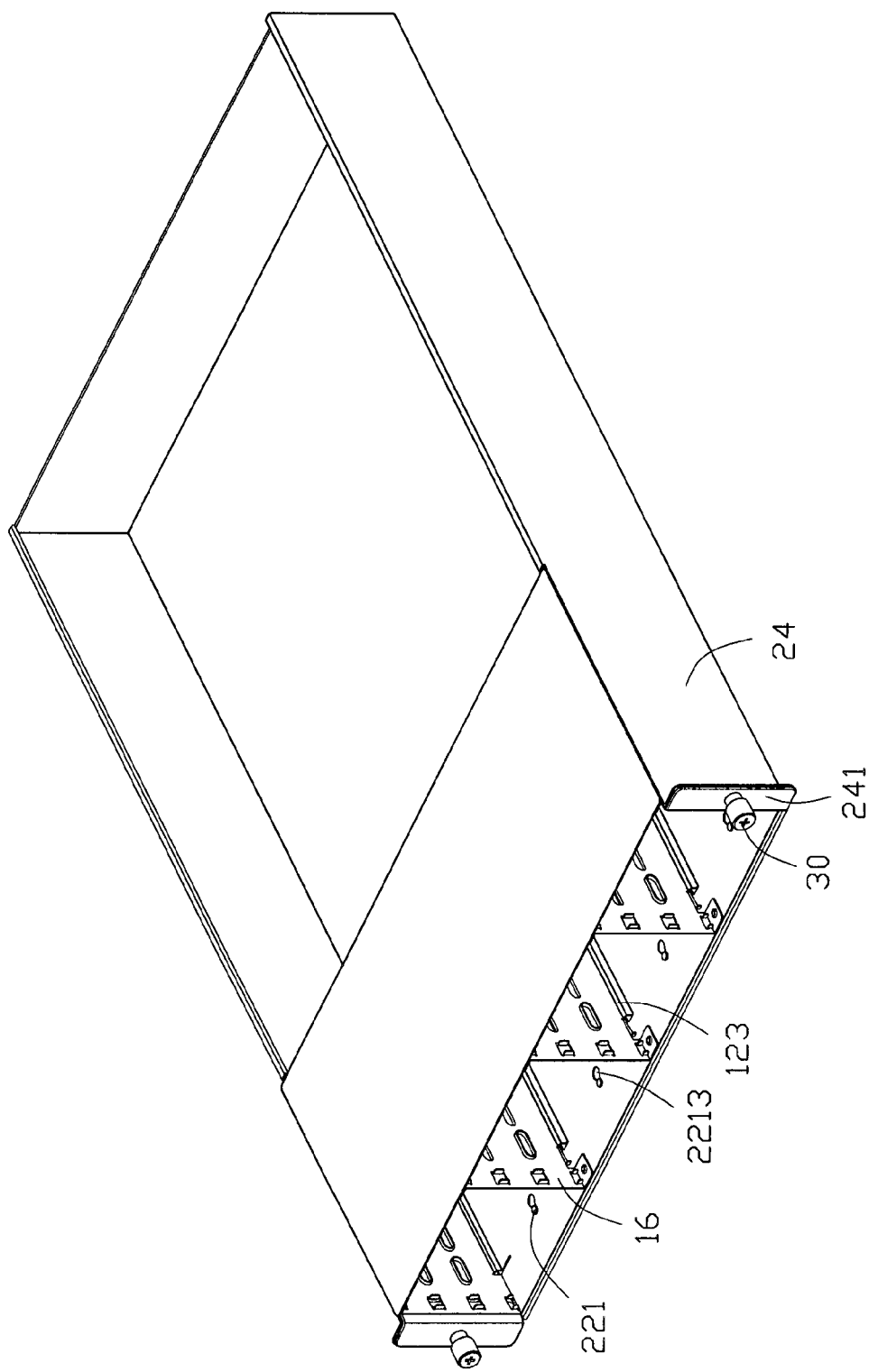
FIG. 3 is an assembled view of FIG. 1.

Referring to FIGS. 1 to 3, in assembly of the disk drive bracket 10, the standoffs 221 of the chassis 20 are inserted through the entrance apertures 1213 of the fixing hole 121 of the disk drive bracket 10, and the slideways 123 of the disk drive bracket 10 are placed on the guideways 223 of the chassis for facilitating sliding of the disk drive bracket 10 into position. Then the disk drive bracket 10 is pushed rearward along the guideways 223 of the chassis 20 until the necks 2211 of the standoffs 221 engage into the fixing apertures 1211 of the fixing holes 121 of the disk drive bracket 10, and the sidewalls 14 and the flanges 141 of the disk drive bracket 10 resist against the side panel 24 and flanges 241 of the chassis 20 respectively. At this point, the securing holes 143 of the flange 141 of the disk drive bracket 10 are aligned with the securing holes 243 of the flange 241 of the chassis 20, and a pair of screws 30 is inserted though the securing holes 143 and 243, fastening the disk drive bracket 10 into the chassis 20. Thus, the data storage devices can be secured into the chassis via the disk drive bracket 10.

In disassembly of the disk drive bracket 20, the screws 30 are removed from the securing holes 243 and 143, then the disk drive bracket 10 is pulled out along the guideways 223 of the chassis 20 until the necks 2211 of the standoffs 221 slide from the fixing apertures 1211 to the entrance apertures 1213 of the fixing hole 121 of the disk drive bracket 10. Then the disk drive bracket 10 is taken out from the chassis 20 after the standoffs 221 of the chassis 20 are totally disengaged from the fixing holes 121 of the disk drive bracket 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
    a chassis comprising a bottom panel, and a pair of side panels connecting with two opposite sides of the bottom panel respectively, at least a standoff being displaced on the bottom panel, the standoff comprising a narrower neck extending upwardly from the bottom panel and a wider band extending from the neck; and
    a disk drive bracket secured to the chassis, comprising a bottom wall resisting against an interior surface of the bottom panel of the chassis and a pair of opposite sidewalls resisting against the side panels of the chassis respectively, at least a fixing hole corresponding to the standoff of the chassis being defined in the bottom wall of the disk drive bracket, the fixing hole comprising a narrower fixing aperture engaging with the neck of the standoff of the chassis and a wider entrance aperture configured to allow the head of the standoff extending therethrough;
    wherein a plurality of parallel slideways extends up from the bottom wall of the disk drive bracket, a plurality of parallel guideways is formed on the bottom panel of the chassis for guiding the slideways sliding thereon;
    wherein each of the slideways and each of the guideways are arc-shaped in cross section, with a same arc length and curvature.

2. The computer enclosure as described in claim 1, wherein a flange with a securing hole defined therein extends perpendicularly from each sidewall of the disk drive bracket, and a flange with a securing hole aligning with the securing hole of the disk drive bracket extends out perpendicularly from each side panel of the chassis, a screw inserts though the securing holes, securing the disk drive bracket into the chassis.

3. The computer enclosure as described in claim 1, wherein a height of the guideways is lower than that of the standoffs of the chassis.

4. The computer enclosure as described in claim 1, wherein a diameter of a cross section of the head of the standoff of the chassis is smaller than that of the entrance aperture of the fixing hole of the disk drive bracket.

5. The computer enclosure as described in claim 4, wherein a diameter of the fixing aperture of the fixing hole of the disk drive bracket is smaller than that of the cross section of the head of the standoff of the chassis.

6. The computer enclosure as described in claim 5, wherein a diameter of the fixing aperture of the fixing hole of the disk drive bracket is approximately the same as that of a cross section of the neck of the standoff.

7. A computer enclosure comprising:
    a disk drive bracket comprising a bottom wall and a pair of sidewalls connecting with two opposite sides of the bottom wall, at least a fixing hole being defined in the bottom wall of the disk drive bracket, a plurality of parallel slideways extending upwards from the bottom wall of the disk drive bracket; and
    a chassis for encasing the disk drive bracket therein, comprising a bottom panel supporting the bottom wall of the disk drive bracket, and a pair of side panels resisting against the sidewalls of the disk drive bracket respectively, at least a standoff for engaging into the fixing hole of the disk drive bracket protruding upwardly from the bottom panel, a plurality of parallel guideways protruding from the bottom panel of the chassis corresponding to the slideways of the disk drive bracket;
    wherein each of the slideways and each of the guideways are arc-shaped in cross section, with a same arc length and curvature.

8. The computer enclosure as described in claim 7, wherein a flange with a securing hole defined therein extends perpendicularly from each of the sidewalls of the disk drive bracket, a flange with a securing hole aligning with the securing hole of the disk drive bracket extends from each of the side panels of the chassis, a stud is inserted through the securing holes of the disk drive bracket and chassis to secure the disk drive bracket into the chassis.

9. The computer enclosure as described in claim 7, wherein the fixing hole comprises a narrower fixing aperture and a wider entrance aperture, the standoff comprises a narrower neck engaging into the fixing aperture of the fixing hole of the disk drive bracket and a wider head for confirming the disk drive bracket.

10. The computer enclosure as described in claim 9, wherein a diameter of a cross section of the head of the standoff of the chassis is smaller than that of the entrance aperture of the fixing hole of the disk drive bracket.

11. The computer enclosure as described in claim 10, wherein a diameter of the fixing aperture of the fixing hole of the disk drive bracket is smaller than that of the cross section of the head of the standoff of the chassis.

12. The computer enclosure as described in claim 11, wherein a diameter of the fixing aperture of the fixing hole of the disk drive bracket is approximately the same as that of a cross section of the neck of the standoff.

13. An electronic apparatus enclosure comprising:
    a chassis comprising a bottom panel, and a pair of side panels extending from two opposite sides of the bottom panel respectively, a plurality of standoffs being disposed on the bottom panel, the standoff comprising a narrow neck extending upwardly from the bottom panel and a wider head extending from the neck;

a disk drive bracket secured to the chassis and configured for holding data storage devices therein, the bracket comprising a bottom wall supported on an interior surface of the bottom panel of the chassis and a pair of opposite sidewalls resisting against the side panels of the chassis respectively, a plurality of fixing holes corresponding to the standoffs of the chassis being defined in the bottom wall, each of the fixing holes comprising a wider entrance aperture configured to allow the head of the corresponding standoff extending therethrough, and a narrower fixing aperture configured to engage with the corresponding standoff at the neck thereof; and a plurality of guiding structures being formed between the chassis and the bracket for guiding the bracket entering into the chassis; each of the guiding structures comprising a slideway extending up from an edge of an opening defined in the bottom wall of the disk drive bracket and a guideway formed on the bottom panel of the chassis for guiding the slideway sliding thereon.

14. The electronic apparatus enclosure as described in claim 13, wherein a flange extends perpendicularly from each of the sidewalls of the bracket, another flange extends from each of the side panels of the chassis, coaxial securing holes are defined the flanges and the another flanges, studs are inserted through the coaxial securing holes to secure the bracket to the chassis.

15. The electronic apparatus enclosure as described in claim 13, wherein the bracket comprises a plurality of dividing walls arranged between the sidewalls for dividing the bracket into a plurality of spaces for holding the data storage devices therein.

16. The electronic apparatus enclosure as described in claim 13, wherein the fixing holes are located adjacent to an opening of the chassis from which the bracket is slid into the chassis.

17. The electronic apparatus enclosure as described in claim 13, wherein the slideways and the guideways are arc-shaped in cross section, with a same arc length and curvature.

* * * * *